United States Patent
Hollstein et al.

[11] Patent Number: 6,030,713
[45] Date of Patent: Feb. 29, 2000

[54] ELECTRICAL OR ELECTRONIC COMPONENTS ENCAPSULATED WITH LIQUID EPOXY RESINS CONTAINING A MIXTURE OF WOLLASTONITE AND CALCITE FILLERS

[75] Inventors: Werner Hollstein, Schliengen; Werner Pfander, Fellbach; Irene Jennrich, Winnenden, all of Germany

[73] Assignees: Ciba Specialty Chemicals Corp., Tarrytown, N.Y.; Robert Bosch GmbH, Stuttgart, Germany

[21] Appl. No.: 09/184,537

[22] Filed: Nov. 2, 1998

Related U.S. Application Data

[60] Division of application No. 08/738,561, Oct. 28, 1996, Pat. No. 5,872,163, and a continuation-in-part of application No. PCT/EP95/02345, Jun. 17, 1995.

[30] Foreign Application Priority Data

Jul. 1, 1994 [CH] Switzerland ............... 2119/94

[51] Int. Cl.7 .............. H01F 27/30; H01L 23/29; C08L 63/02; C08K 3/34; C08K 3/26
[52] U.S. Cl. .............. 428/620; 438/127; 257/793; 336/205; 523/440; 523/443; 523/457; 523/466
[58] Field of Search .............. 428/620; 257/793; 438/127; 336/205; 523/440, 443, 457, 466

[56] References Cited

U.S. PATENT DOCUMENTS

| | | | |
|---|---|---|---|
| 4,268,810 | 5/1981 | Iwasa et al. | 336/205 |
| 4,401,776 | 8/1983 | Munk | 523/443 |
| 4,490,492 | 12/1984 | Skuldeny et al. | 523/443 |
| 4,966,928 | 10/1990 | Kitagawa et al. | 523/437 |
| 4,992,488 | 2/1991 | Ruf | 523/428 |
| 5,064,881 | 11/1991 | Togashi et al. | 523/443 |
| 5,354,939 | 10/1994 | Hollstein et al. | 523/206 |

FOREIGN PATENT DOCUMENTS

| | | |
|---|---|---|
| 0245208 | 11/1987 | European Pat. Off. . |
| 034819 | 12/1989 | European Pat. Off. . |
| 0414975 | 3/1991 | European Pat. Off. . |
| 0540467 | 5/1993 | European Pat. Off. . |
| 3229558 | 2/1984 | Germany . |
| 61-106618 | 5/1986 | Japan . |

OTHER PUBLICATIONS

Lee et al., "Handbook of Epoxy Resins", McGraw Hill Book Co., New York, pp. 11/1,12/1,14/5 (Reissue 1982).

*Primary Examiner*—Donald R. Wilson
*Attorney, Agent, or Firm*—Michele A. Kovaleski

[57] ABSTRACT

Epoxy resin casting compositions comprising (a) a liquid aromatic glycidyl or β-methylglycidyl ether or a liquid mixture of several aromatic glycidyl or β-methylglycidyl ethers containing on average more than one glycidyl ether group per molecule, (b) one or more than one acid hardener for the glycidyl ether, (c) a curing accelerator, (d) a filler mixture containing calcite and wollastonite in an amount from 40 to 60% by weight, based on components (a), (b) and (d), and as optional components, (e) customary additives for epoxy resin casting compositions are suitable in particular for coating or encapsulating electrical or electronic components and, more particularly, electrical ignition coils.

16 Claims, No Drawings

ELECTRICAL OR ELECTRONIC COMPONENTS ENCAPSULATED WITH LIQUID EPOXY RESINS CONTAINING A MIXTURE OF WOLLASTONITE AND CALCITE FILLERS

This application is a divisional of prior application Ser. No. 08/738,561 filed Oct. 28, 1996, now U.S. Pat. No. 5,872,163, which is a continuation-in-part application of the International Application PCT/EP 95/02345 with an international filing date of Jun. 17, 1995, which claims priority to application of Swiss application 2119/94-4 filed Jul. 1, 1994, now abandoned.

The present invention relates to an epoxy resin casting composition containing calcite and wollastonite as fillers and which is suitable for use in particular for coating or encapsulating electrical or electronic components and, more particularly, electrical ignition coils.

Epoxy resin casting compositions for coating or encapsulating electrical or electronic components are known. EP-A-0 348 193, inter alia, discloses an epoxy resin casting composition loaded with an inorganic filler for encapsulating ignition coils and, in addition, a polyether polyol to prevent, in particular, corrosion of the coil and of the winding. However, polyether polyols have the drawback of lowering the glass transition temperature (Tg value) of the epoxy resin casting composition.

DE-OS 32 29 558 discloses epoxy resin casting compositions loaded with chalk for impregnating or casting electrical components. However, while the cured epoxy resin casting compositions have a higher Tg value, they are often too brittle and do not meet the requirements made of them when subjected to the temperature shock test. Moreover, they comprise a blend of aromatic and cycloaliphatic epoxy resin which may lead to toxicological problems.

The epoxy resin casting compositions disclosed in EP-A-0540 467 containing quartz powder as filler and a polyether polyol, also do not meet the requirements when subjected to the temperature shock test.

Surprisingly, it has now been found that the above-mentioned drawbacks of an epoxy resin casting composition based on aromatic glycidyl ethers may be avoided by adding to this composition a filler mixture containing calcite and wollastonite in specific amounts.

Accordingly, the object of this invention is to provide an epoxy resin casting composition comprising (a) a liquid aromatic glycidyl or β-methylglycidyl ether or a liquid mixture of several aromatic glycidyl or β-methylglycidyl ethers containing on average more than one glycidyl ether group per molecule, (b) one or more than one acid hardener for the glycidyl ether, (c) a curing accelerator, (d) a filler mixture containing calcite and wollastonite in an amount from 40 to 60% by weight, based on components (a), (b) and (d), and as optional components, (e) customary additives for epoxy resin casting compositions.

Suitable components (a) are all aromatic glycidyl or β-methylglycidyl ethers as well as mixtures of several aromatic glycidyl or β-methylglycidyl ethers, provided they remain liquid at temperatures of up to c. 50° C. This means that it is also possible to use mixtures of liquid and solid glycidyl or β-methylglycidyl ethers as well as mixtures of mono- and di(β-methyl)glycidyl ethers or of mono- and poly(β-methyl)glycidyl ethers, provided that a liquid mixture is obtained for component (a) and that the glycidyl compounds in this mixture contain on average more than one glycidyl group in the molecule.

Such glycidyl ethers are known and are obtainable, for example, by reacting a compound containing at least one or more than one free phenolic hydroxyl group with epichlorohydrin or β-methylepichlorohydrin under alkaline conditions or in the presence of an acid catalyst and by subsequent treatment with alkali.

The glycidyl ethers of this type are typically derived from mononuclear phenols, typically from phenol, 2-methylphenol, 4-tert-butylphenol, resorcinol or hydroquinone, or they are based on polynuclear phenols, typically bis(4-hydroxyphenyl)methane, 4,4'-dihydroxybiphenyl, bis(4-hydroxyphenyl)sulfone, 1,1,2,2-tetrakis(4-hydroxyphenyl)ethane, 2,2-bis(4-hydroxyphenyl)propane, 2,2-bis(3,5-dibromo-4-hydroxyphenyl)propane, as well as the novolaks obtainable by condensation of aldehydes, typically formaldehyde, acetaldehyde, chloral or furfuraldehyde, with phenols such as phenol, or with phenols substituted in the nucleus by one or more than one chlorine atom or by one or more than one $C_1$–$C_9$alkyl group, for example 4-chlorophenol, 2-methylphenol or 4-tert-butylphenol, or by condensation with bisphenols such as those of the indicated type.

It is preferred to use glycidyl ethers having an epoxy content from 1 to 10 equivalents/kpc for the novel epoxy resin casting compositions.

Component (a) of the inventive epoxy resin casting compositions is preferably a liquid diglycidyl ether of bisphenol A or a liquid diglycidyl ether of bisphenol F.

Suitable components (b) are usually the polycarboxylic acids and the anhydrides thereof, typically aliphatic polycarboxylic acids such as maleic acid, oxalic acid, succinic acid, nonyl- or dodecylsuccinic acid, glutaric acid, adipic acid, pimelic acid, suberic acid, azelaic acid or dimerised or trimerised linoleic acid, cycloaliphatic polycarboxylic acids such as tetrahydrophthalic acid, methylenedomethylenetetrahydrophthalic acid, hexachloroendomethylenetetrahydrophthalic acid, 4-methyltetrahydrophthalic acid, hexahydrophthalic acid, or 4-methylhexahydrophthalic acid, or aromatic polycarboxylic acids such as phthalic acid, isophthalic acid, terephthalic acid, trimellitic acid, pyromellitic acid or benzophenone-3,3',4,4'-tetracarboxylic acid, as well as the anhydrides of the cited polycarboxylic acids.

Component (b) of the novel epoxy resin casting compositions is preferably a polycarboxylic anhydride.

In particular, component (b) of the novel epoxy resin casting compositions is a cycloaliphatic polycarboxylic anhydride.

The amount of the hardener (b) will depend on the chemical nature of the hardener and on the desired properties of the curable mixture and the hardened product. Typically from 0.4 to 1.1 equivalents of carboxyl group or anhydride group are used per 1 epoxy equivalent of the glycidyl ether (a).

Suitable curing accelerators (c) are typically tertiary amines or the salts thereof, such as 2,4,6-tris(dimethylaminoethyl)phenol and other Mannich bases, N-benzyldimethylamine and triethanolamine, imidazoles, e.g. 1-methylimidazole, quaternary ammonium salts, e.g. benzyltrimethylammonium chloride, alkali metal alkoxides or phosphonium salts, e.g. tetraphenylphosphonium bromide.

Component (c) of the inventive epoxy resin casting composition is preferably a tertiary amine, a quaternary ammonium salt, an imidazole or a phosphonium salt.

In its pure form, the calcite used in the novel epoxy resin casting composition as filler consists of colourless transparent crystals and is commercially available in various particle sizes. The epoxy resin casting compositions of this invention preferably contain a calcite having a particle size of less than 10 μm.

The wollastonite used as further filler in the inventive epoxy resin casting compositions is a naturally occuring calcium silicate of formula $Ca_3[Si_3O_9]$ of needle-like shape and having a particle size in the micron range. The artificially manufactured wollastonite is also of needle-like shape. Wollastonite is commercially available, e.g. from Oy Partek.

The filler mixture (d) of the novel epoxy resin casting compositions preferably has a particle size of less than 25 μm. More particularly, this filler mixture (d) has a particle size of less than 20 μm.

Customary additives (e) for epoxy resin casting compositions which may be added to the novel epoxy resin casting compositions are further fillers such as quartz powder, aluminium hydroxide, aluminium oxide, calcium carbonate, further calcium silicates, mica, glass fibres, glass powder or dolomite, pigments or dyes such as titanium oxide, carbon black or iron oxide black, flame retardants, thixotropic agents, flow control agents such as silicones, silicone oil, waxes or stearates, some of which also find utility as mould release agents, e.g. γ-glycidyloxipropyltrimethoxysilane, antioxidants or light stabilisers, the amount of additives in the inventive epoxy resin casting compositions being altogether not more than 10% by weight, based on components (a) and (b).

Component (e) of the novel epoxy resin casting compositions is preferably a sheet silicate modified by a quaternary organic ammonium salt, more particularly based on the mineral clay bentonite, commercially available under the registered trademark Bentone®, supplied by NL Chemicals.

The novel epoxy resin casting compositions can be prepared in conventional manner by mixing the components with known mixing aggregates, typically stirrers, kneaders or roll mills.

The epoxy resin casting compositions of this invention are liquid at ambient temperature and have very good impregnating as well as antideposition and deaerating properties. The ignition coils encapsulated with the novel epoxy resin casting compositions typically show excellent impregnation of the fine wire winding of the secondary coil.

The novel epoxy resin casting compositions can be cured in known manner by heating.

The heating step can also be carried out stepwise. Curing is usually effected by heating to the temperature range from 80 to 200° C., preferably from 100 to 180° C.

The components encapsulated with the fully cured novel epoxy resin casting compositions are distinguished by high resistance to thermal ageing and good tear resistance, in particular in the durability test and in the temperature shock test.

By virtue of their excellent stability to thermal and mechanical stress, the fully cured novel epoxy resin casting compositions are particularly suitable for utilities in vacuum casting resin technology and, more particularly, for encapsulating electrical or electronic components.

Accordingly, the invention also relates to the use of the novel epoxy resin casting compositions for encapsulating electrical or electronic components and, in particular, for encapsulating electrical ignition coils.

EXAMPLE 1

34.15 g of liquid diglycidyl ether of bisphenol A (epoxy value from 5.2 to 5.4 equivalent/kg; viscosity from 1000 to 1200 mPa.s), 0.05 g of silicone oil (Silicone SH 5500, supplied by Toray Industries), 0.3g of γ-glycidyloxipropyltrimethoxysilane (Silan® A-187, supplied by Union Carbide Chemicals) and 0.5 g of iron oxide black are mixed. To this mixture are added, as fillers, in increments and with stirring, 24.9 g of calcite having a particle size from 5–7 μm, density 50% (Juraweiss, Gelbsiegel, supplied by Ulmer Füllstoffvertrieb), 40 g of wollastonite (Wollastonit FW 200, supplied by Oy Partek) and 0.1 g of Bentone® SD-2 (bentonite which is modified by a quaternary organic ammonium salt, supplied by NL Chemicals). The loaded epoxy resin is blended with 28.83 g of methylhexahydrophthalic anhydride and 0.17 g of 1-methylimidazole to give a low viscosity reaction resin composition (RRC) as casting resin, having the following properties:

| | |
|---|---|
| viscosity at 60° C. (DIN 16945) | =500 mPa · s |
| gel time at 90° C (DIN 16945) | =60 min. |

Before the ignition coils are encapsulated with the casting resin, they are preheated to above 100° C. over at least 2 hours and then evacuated at 1 mbar for 2 minutes. The RRC is degassed in a storage vessel at 60° C. and 1 mbar. The ignition coils are then encapsulated in known manner by the vacuum casting technique at 4 mbar. Subsequently, the encapsulation of the ignition coils is cured in an oven, first at 90° C. for 1.5 hours and then at 120° C. for a further 2 hours. The mouldings so obtained have the following properties:

| | |
|---|---|
| glass transition temperature (DSC*) | =135–140° C. |
| flexural strength (ISO 178) | =90 N/mm$^2$ |
| modulus of elasticity (ISO 178) | =7600 N/mm$^2$ |
| flexural elongation (ISO 178) | =1.4% |
| linear thermal coefficient of expansion (TMA**) | =40 ppm/K. |

*DSC = differential scanning calorimeter
**TMA = thermomechanical analysis

The ignition coils encapsulated with the fully cured casting resin withstand the following tests:

temperature shock test, after one hour from −40° C. to 120° C. and after one hour from 120° C. to −40° C. over 400 cycles, i.e. over 800 hours.

Durability test at 140° C. ambient temperature over more than 1000 hours.

If the ignition coils encapsulated with the fully cured casting resin are cut through and the cut surfaces are then polished, it is found that the windings of the primary and secondary coils are completely impregnated with the casting resin.

EXAMPLE 2

34.15 g of a liquid diglycidyl ether of bisphenol F (epoxy value from 5.5 to 5.8 equivalents/kg), 0.05 g of silicone oil (Silicone SH 5500, supplied by Toray Industries), 0.3 g of γ-glycidyloxipropyltrimethoxysilane and 0.5 g of iron oxide black are mixed. To this mixture are added, as fillers, in increments and with stirring, 24.9 g of calcite having a particle size from 5 to 7 μm (Juraweiss), 40.0 g of wollastonite FW 200 and 0.1 g of Bentone® SD-2. The loaded epoxy resin is blended with 29.82 g of methylhexahydrophthalic anhydride and 0.18 g of 1-methylimidazole to give a low viscosity reaction resin composition as casting resin, having the following properties:

viscosity at 60° C. (DIN 16945)=350 mPa.s gel time at 90° C. (DIN 16945)=55 min.

The ignition coils are encapsulated with the casting resin in general accordance with the technology employed in Example 1. The mouldings so obtained have the following properties:

| | |
|---|---|
| glass transition temperature (DSC) | =130–135° C. |
| flexural strength (ISO 178) | =100 N/mm² |
| modulus of elasticity (ISO 178) | =7500 N/mm² |
| flexural elongation (ISO 178) | =1.4% |
| linear thermal coefficient of expansion (TMA) | =40 ppm/K. |

The ignition coils encapsulated with the casting resin withstand the tests described in Example 1 and show complete impregnation of the windings.

EXAMPLE 3

34.15 g of a liquid diglycidyl ether of bisphenol A (epoxy value from 5.2 to 5.4 equivalents/kg), 0.05 g of silicone oil (Silicone SH 5500, supplied by Toray Industries), 0.3 g of γ-glycidyloxipropyltrimethoxysilane and 0.5 g of iron oxide black are mixed. To this mixture are added, as fillers, in increments and with stirring, 40.0 g of calcite having a particle size from 5 to 7 μm (Juraweiss), 24.9 g of wollastonite FW 200 and 0.1 g of bentone® SD-2. The loaded epoxy resin is blended with 29.82 g of methylhexahydrophthalic anhydride and 0.18 g of 1-methylimidazole to give a low viscosity reaction resin composition as casting resin, having the following properties:

| | |
|---|---|
| viscosity at 60° C. (DIN 16945) | =400 mPa · s |
| gel time at 90° C (DIN 16945) | =55 min. |

The ignition coils are encapsulated with the casting resin in general accordance with the technology employed in Example 1. The mouldings so obtained have the following properties:

| | |
|---|---|
| glass transition temperature (DSC) | =130–135° C. |
| flexural strength (ISO 178) | =100 N/mm² |
| modulus of elasticity (ISO 178) | =7500 N/mm² |
| flexural elongation (ISO 178) | =1.4% |
| linear thermal coefficient of expansion (TMA) | =40 ppm/K. |

The ignition coils encapsulated with the casting resin withstand the tests described in Example 1 and show complete impregnation of the windings. In addition, the cured casting resin composition shows no sedimentation whatever and the fillers are homogeneously distributed throughout the encapsulation, as may be found by determining the ash content of samples taken from different sites of the encapsulation.

EXAMPLE 4

34.45 g of a liquid diglycidyl ether of bisphenol A (epoxy value from 5.2 to 5.4 equivalents/kg), 0.05 g silicone oil (Silicone SH 5500, supplied by Toray Industries) and 0.5 g of colour paste, commercially available under the registered trademark Araldite®DW 0137, supplied by Ciba-Geigy, are mixed. To this mixture are added, as fillers, in increments and with stirring, 40.0 g of calcite having a particle size from 5 to 7 μm (Juraweiss), 24.8 g of wollastonite FW 200 and 0.1 g of bentone® SD-2. The loaded epoxy resin is blended with 20.18 g of hexahydrophthalic anhydride, 8.65 g of methylhexahydrophthalic anhydride and 0.17 g of 1-methylimidazole to give a low viscosity reaction resin composition as casting resin, having the following properties:

| | |
|---|---|
| viscosity at 60° C. (DIN 16945) | =450 mPa · s |
| gel time at 90° C. (DIN 16945) | =60 min. |

The ignition coils are encapsulated with the casting resin in general accordance with the technology employed in Example 1. The mouldings so obtained have the following properties:

| | |
|---|---|
| glass transition temperature (DSC) | =135–140° C. |
| flexural strength (ISO 178) | =95 N/mm² |
| modulus of elasticity (ISO 178) | =7600 N/mm² |
| flexural elongation (ISO 178) | =1.4% |
| linear thermal coefficient of expansion (TMA) | =40 ppm/K. |

The ignition coils encapsulated with the fully cured casting resin withstand the following tests:

temperature shock test, after one hour from −40° C. to 120° C. and after one hour from 120° C. to −40° C. over 600 cycles, i.e. over 1200 hours.

Durability test at 140° C. ambient temperature over more than 2000 hours.

On cutting through the ignition coils encapsulated with the fully cured casting resin and polishing the cut surfaces, it is found that the windings of the primary and secondary coils are completely impregnated with the casting resin. The fully cured casting resin composition shows a homogeneous distribution of the fillers as may be found by determining the ash content of different samples of the moulding.

What is claimed is:

1. An electrical or electronic component encapsulated with an epoxy resin casting composition that is liquid at ambient conditions consisting essentially of (a) a liquid epoxy resin component selected from the group consisting of glycidyl ethers of phenolic compounds containing on average more than one glycidyl ether group per molecule, β-methylglycidyl ethers of phenolic compounds containing on average more than one glycidyl ether group per molecule, and mixtures thereof, (b) one or more than one acid hardener for the resin component, (c) a curing accelerator, (d) a filler mixture containing calcite and wollastonite in an amount from 40 to 60% by weight, based on components (a), (b) and (d), wherein the weight ratio of calcite to wollastonite is in the range of about 38:62 to 62:38, and as optional components, (e) customary additives for epoxy resin casting compositions selected from the group consisting of quartz powder, aluminum hydroxide, aluminum oxide, mica, glass fibers, glass powder, dolomite, pigments, dyes, flame retardants, thixotropic agents, flow control agents, antioxidants, light stabilizers and sheet silicate, which is modified by quaternary organic ammonium salt.

2. An electrical or electronic component encapsulated with an epoxy resin casting composition according to claim 1, wherein component (a) is a liquid diglycidyl ether of bisphenol A or a liquid diglycidyl ether of bisphenol F.

3. An electrical or electronic component encapsulated with an epoxy resin casting composition according to claim 1, wherein component (b) is a carboxylic anhydride.

4. An electrical or electronic component encapsulated with an epoxy resin casting composition according to claim 1, wherein component (b) is a cycloaliphatic carboxylic anhydride.

5. An electrical or electronic component encapsulated with an epoxy resin casting composition according to claim 1, wherein component c) is a tertiary amine, a quaternary ammonium salt, an imidazole or a phosphonium salt.

6. An electrical or electronic component encapsulated with an epoxy resin casting composition according to claim 1, wherein the filler mixture (d) has a particle size of less than 25 $\mu$m.

7. An electrical or electronic component encapsulated with an epoxy resin casting composition according to claim 1, wherein the filler mixture (d) has a particle size of less than 20 $\mu$m.

8. An electrical or electronic component encapsulated with an epoxy resin casting composition according to claim 1, wherein component (e) contains a sheet silicate which is modified by a quaternary organic ammonium salt.

9. An electrical ignition coil encapsulated with an epoxy resin casting composition that is liquid at ambient conditions consisting essentially of (a) a liquid epoxy resin component selected from the group consisting of glycidyl ethers of phenolic compounds containing on average more than one glycidyl ether group per molecule, β-methylglycidyl ethers of phenolic compounds containing on average more than one glycidyl ether group per molecule, and mixtures thereof, (b) one or more than one acid hardener for the resin component, (c) a curing accelerator, (d) a filler mixture containing calcite and wollastonite in an amount from 40 to 60% by weight, based on components (a), (b) and (d), wherein the weight ratio of calcite to wollastonite is in the range of about 38:62 to 62:38, and as optional components, (e) customary additives for epoxy resin casting compositions selected from the group consisting of quartz powder, aluminum hydroxide, aluminum oxide, mica, glass fibers, glass powder, dolomite, pigments, dyes, flame retardants, thixotropic agents, flow control agents, antioxidants, light stabilizers and sheet silicate, which is modified by quaternary organic ammonium salt.

10. An electrical ignition coil encapsulated with an epoxy resin casting composition according to claim 9, wherein component (a) is a liquid diglycidyl ether of bisphenol A or a liquid diglycidyl ether of bisphenol F.

11. An electrical ignition coil encapsulated with an epoxy resin casting composition according to claim 9, wherein component (b) is a carboxylic anhydride.

12. An electrical ignition coil encapsulated with an epoxy resin casting composition according to claim 9, wherein component (b) is a cycloaliphatic carboxylic anhydride.

13. An electrical ignition coil encapsulated with an epoxy resin casting composition according to claim 9, wherein component c) is a tertiary amine, a quaternary ammonium salt, an imidazole or a phosphonium salt.

14. An electrical ignition coil encapsulated with an epoxy resin casting composition according to claim 9, wherein the filler mixture (d) has a particle size of less than 25 $\mu$m.

15. An electrical ignition coil encapsulated with an epoxy resin casting composition according to claim 9, wherein the filler mixture (d) has a particle size of less than 20 $\mu$m.

16. An electrical ignition coil encapsulated with an epoxy resin casting composition according to claim 9, wherein component (e) contains a sheet silicate which is modified by a quaternary organic ammonium salt.

* * * * *